United States Patent
MacFarlane et al.

(10) Patent No.: US 6,687,461 B1
(45) Date of Patent: Feb. 3, 2004

(54) ACTIVE OPTICAL LATTICE FILTERS

(75) Inventors: Duncan L. MacFarlane, Dallas, TX (US); Eric M. Dowling, Richardson, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 0 days.

(21) Appl. No.: 09/432,352

(22) Filed: Nov. 2, 1999

Related U.S. Application Data (60) Provisional application No. 60/106,978, filed on Nov. 4, 1998.

(51) Int. Cl.[7] .............................. H04J 14/02; H01S 3/00
(52) U.S. Cl. .......................................... 398/82; 359/344
(58) Field of Search ................... 359/128, 333, 359/344; 372/43; 398/82

(56) References Cited

U.S. PATENT DOCUMENTS

| | | | | |
|---|---|---|---|---|
| 3,828,231 A | * | 8/1974 | Yamamoto | 327/514 |
| 5,343,496 A | | 8/1994 | Honig et al. | 375/1 |
| 5,363,403 A | | 11/1994 | Schilling et al. | 375/1 |
| 5,481,533 A | | 1/1996 | Honig et al. | 370/18 |
| 5,553,062 A | | 9/1996 | Schilling et al. | 370/18 |
| 5,572,552 A | | 11/1996 | Dent et al. | 375/343 |
| 5,629,929 A | | 5/1997 | Blanchard et al. | 370/201 |
| 5,644,592 A | | 7/1997 | Divsalar et al. | 375/206 |
| 5,671,247 A | | 9/1997 | Souissi et al. | 375/200 |
| 5,680,419 A | | 10/1997 | Bottomley | 375/347 |
| 5,687,162 A | | 11/1997 | Yoshida et al. | 370/203 |
| 5,719,852 A | | 2/1998 | Schilling et al. | 370/201 |
| 5,754,714 A | * | 5/1998 | Suzuki et al. | 385/5 |
| 5,757,832 A | * | 5/1998 | Uchida | 372/45 |
| 6,023,366 A | * | 2/2000 | Kinoshita | 359/177 |
| 6,483,632 B1 | * | 11/2002 | Jolley et al. | 359/337.4 |

OTHER PUBLICATIONS

Umesh G. Jani, Eric M. Dowling, R.M. Golden and Zigel Wang, "Multiuser Interference Suppression Using Block Shanno Constant Modulus Algorithm," 10 pages.

* cited by examiner

*Primary Examiner*—Leslie Pascal
*Assistant Examiner*—Shi K. Li
(74) *Attorney, Agent, or Firm*—Gardere Wynne Sewell LLP (57) ABSTRACT

The present invention is an optical signal processing apparatus which centers around an active optical filter. The active optical lattice filter permits ultra-high bandwidth signal processing of optical signals. The filter utilizes a lattice arrangement of optical amplifiers and interfaces which feed and reinforce each other. The lattice sections are constructed of a semiconductive material so that the device may be used as an optoelectronic component of an optical communications system. A control voltage is applied to each optical amplifier thereby enabling a user to electronically control and tune the optical transfer function of the device. The lattice parameters may be adjusted to produce an tunable oscillation to produce a precision optical line frequency. Precision optical line frequencies are useful in dense wavelength division multiplexers. Also, the lattice parameters may be adjusted to produce very high-Q optical filters are needed to construct dense wavelength division demultiplexers. As the filter parameters may be rapidly and electronically adjusted, a wavelength division demultiplexer constructed according to the present invention may be operated in a mode to perform fast optical switching. Similarly, when the present invention is configured to generate line frequencies, the apparatus may be controlled to generate a rapidly time varying sequence of line frequencies, also useful for optical switching.

13 Claims, 5 Drawing Sheets

ACTIVE OPTICAL LATTICE FILTERS

This application claims priority based on U.S. Provisional Application Ser. No. 60/106,978 filed on Nov. 4, 1998.

TECHNICAL FIELD OF THE INVENTION

The present invention relates generally to optical filtering, and more specifically to an active optical lattice filter having an electronically controlled gain for ultra-high bit rate digital signal processing. The invention is also specifically related to optical frequency synthesis, wavelength division multiplexing, wavelength division demultiplexing, and optical switching.

BACKGROUND OF THE INVENTION

Accurate, efficient, high-speed digital communication systems are increasingly in demand. One advance that has revolutionized the speed and efficiency of digital communication systems is the use of optical signal transmission and processing. Transmitting digital data through the use of light impulses, rather than electrical impulses, is useful for high-speed communications because the available bandwidth of light is many orders of magnitude larger than that of electronics. Additionally, optical signal transmission does not suffer from the same loss of signal over distance experienced with electronic data transmission.

Optical signals are typically transmitted through optical fibers, which are transparent and have a very low loss. Fibers are an example of a dielectric waveguide and may therefore be flexibly routed through buildings and other structures. Many modem communication systems send more than one signal through a single fiber. Multiple signals can travel down a single fiber by use of a process called multiplexing. Wavelength division multiplexing is a procedure by which a transmitter blends signals of different wavelengths into one signal. Increasing the number of signals that can travel through one fiber increases the overall capacity of the communication system. But the systems that receive multiplexed signals must be capable of separating out the individual signals. This is known as demultiplexing.

In addition to a demultiplexing apparatus there is a need for an apparatus capable of compensating for irregularities in the signal including chirp, polarization and frequency dispersion. Frequency dispersion causes higher frequency signals to lag behind lower frequency signals. The wider the frequency bandwidth, the more noticeable the lag. This creates complications at the receiver end of a system because the receiver must be able to sense and remove the undesired lag between frequencies. It is also desirable to perform timing recovery at the receiving end or at specified intervals along the transmission path.

Previous methods of detection and filtration of high-capacity multiplexed optical signals are limited by inherent physical limitations. Many present optical filters rely on the physical movement of lenses and mirrors to filter out individual signals. These mechanical filters are referred to as passive optical filters.

One type of passive optical filter is a deformable mirror device ("DMD"). DMDs rely on the physical movement of mirrors to filter optical signals. Accordingly, the speed of a DMD optical signal processor is limited by how quickly the mirrors may be physically manipulated. Additionally, the use of mirrors as a deflecting component, requires a high amount of maintenance and physical tuning in order to maintain the accuracy of the system. Because of these limitations, DMDs are capable of modulating only signal frequencies less than 10 kHz.

Another type of passive optical filter is a Fabry-Perot etalon composed of two or more mirrors facing each other which form an optical cavity or resonator. Due to constructive and destructive interference of the reflected waves, the transmission and reflection of these etalons are frequency, and wavelength dependent. These devices therefore act as filters with magnitude and phase responses.

Another type of resonator structure which can be used as a passive optical filter is a fiber ring resonator. In this device a fiber splitter routes part of the optical signal down a delay path or a series of delay paths. The delayed signals are then remixed with the main signal. The frequency and wavelength dependent constructive or destructive interference of the mixing leads to a filter response which is frequency and wavelength dependent. These devices therefore act as filters with magnitude and phase responses.

Another type of passive optical filter is a grating which is an array or closely spaced line features. Gratings work in either reflection or transmission, and the latter is often preferred in current lightwave systems. An optical signal which encounters a grating is deflected into a direction which depends on its wavelength. In this way demultiplexing may be accomplished by routing different channels into different directions, where they may be detected by different receivers.

An alternative to filtering the optical signal is to detect the optical signal and convert it to an electrical signal. Conventional digital or analog filtering may then be done on the electronic signal. This scheme suffers, however, from much lower bandwidth capability, and will not allow for wavelength division multiplexing, because the spectrum of channels will be simultaneously detected.

Another type of passive optical filter is an acoustical-optic spatial light modulator. This filter uses a RF transducer to launch a compressional wave into a transparent crystal medium, causing a change in the refractive index of the medium. While faster than DMDs, acoustical-optic spatial light modulators are speed-limited and capable of modulating only signal frequencies less than 10 MHZ.

In order to meet the upcoming demand for optical digital signal processors with speed in the GHz range and possibly up to the THz range, a new type of optical filter is needed. Accordingly, it is desirable to have a high-speed optical filter that is not limited by the physical restrictions of previous optical filters.

SUMMARY OF THE INVENTION

The present invention provides an active high-speed optical lattice filter with electrically-tunable gain. More specifically, an active optical signal filter comprising two or more gain blocks and a current source independently electrically connected to a first electrode and a second electrode associated with each of the gain blocks, whereby currents can be passed through the gain blocks, the currents being controlled by the current source. Each gain block comprises the first electrode, an n-tppe primary layer electrically connected to the first electrode, an active layer electrically connected to the n-type primary layer, a p-type primary layer electrically connected to the active layer, and the second electrode electrically connected to the p-type primary layer wherein the active layers of the gain blocks are optically connected in series.

Inasmuch as active filters possess variable gains, active filters overcome inherent losses always present in passive systems. The result is a higher quality factor which means sharper frequency definitions, filter skirts, and roll-offs. Further, active control provides for switching and logic capabilities not present in passive filters.

By adding the ability to electronically tune the gain to a conventional optical lattice filter allows programmability and algorithmic self-tuning capabilities, enabling ultra-high bit-rate optical digital signal processing and switching at speeds much faster than can be obtained with current technology.

Because the optical lattice filter has gain and voltage and/or current control, this system is what is known as an active system. An active system can accept an applied control signal, make a quick analysis, then generate an error signal if needed. This gives a system the capability to be adaptively tuned on-line at GHz rates. Furthermore, an active system may have programmability and algorithmic self-tuning to facilitate the high-speed active filtering process.

The present invention further integrates an active optical lattice filter into semiconductor laser material, allowing electronically controlled gain and tunability while preserving bandwidth and quality. Having a lattice filter composed of semiconductor structures, a system of this type may be integrated so far as to accommodate multiple layers. This means a device capable of handling an extremely wide-band signal may be extremely portable. Having a system requiring so little space allows more space for other components, and is often less sensitive to environmental changes.

The present invention centers around an active optical lattice filter. The active optical lattice filter is more generally embodied within an optical signal processor apparatus. The optical lattice filter is capable of filtering an optical signal such as modulated laser beam received through a fiber. The filter of the present invention provides the benefits normally associated with adaptive digital lattice filters, but may be used to operate on signals in the GHz and THz ranges. The active optical lattice filter of the present invention may be operated in a mode which produces oscillations. The parameters of the active optical lattice filter may be adjusted to provide a frequency controlled laser signal. An adjustable precise laser frequency generator is useful for providing a source color in a dense wavelength division multiplexer. The active optical lattice filter of the present invention may also be used in a configuration to construct a dense wavelength demultiplexer. When control signals are applied to rapidly switch the gains from a first set of values to a second set of values, the device's transfer function switches accordingly, and hence the device may be operated as an optical switch or a voltage controlled optical frequency synthesizer. When configured and operated accordingly, the optical signal processing apparatus of the present invention takes on the form of an optical switching system. All of these embodiments are different configurations of the basic optical signal processor apparatus of the present invention.

BRIEF DESCRIPTION OF THE DRAWINGS

For a more complete understanding of the present invention, including its features and advantages, reference is now made to the following detailed description, taken in conjunction with the accompanying drawings in which.

DETAILED DESCRIPTION OF THE INVENTION

Figure 1:
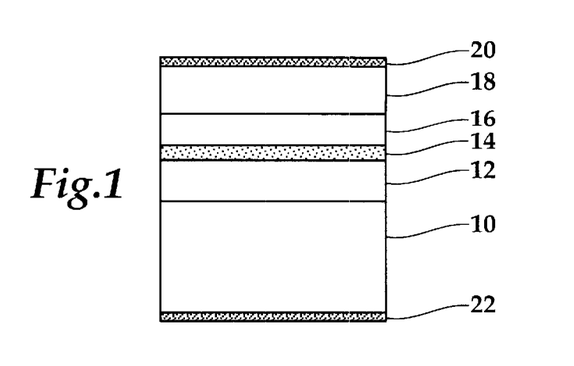
FIG. 1 is a cross-sectional view of a double-heterostructure laser.

A semiconductor laser typically contains at least three layers, a p-type layer, and n-type layer, and a separate active or junction layer where recombination can occur to produce light. FIG. 1 shows a cross-sectional view of a double heterostructure laser. For this embodiment, an n-type substrate 10 is used as a base. An n-type secondary layer 12 is formed over the n-type substrate 10. Active layer 14 is formed over n-type secondary layer 12 and may consist of the same material as n-type substrate 10. P-type secondary layer 16 is formed over active layer 14 and may be formed from the same material as n-type secondary layer 12. P-type primary layer 18 is formed over p-type secondary layer 16. Metal contacts 20 and 22 may be added to the top and bottom of the structure, respectively, in order to run a current through the structure.

Any number of semiconductor laser structures may be used to form the semiconductor laser amplifier portion of the invention. Some examples include, but are not limited to, gain-guided laser structures, index-guided laser structures, and distributed feedback, or Bragg laser structures. Any other semiconductor laser structure will work as a laser amplifier portion of the invention as long as it contains an active layer, metal contacts through which to run a current, an input into which an optical signal can be transmitted, and an output through which the amplified optical signal can be passed on.

When the composition of the layers 10–18 is chosen, two specifications must be known. Layers 10–18, depending on composition and injection current, will react to a specific frequency. The following table lists some semiconductor laser materials and their useful wavelength range:

TABLE 1

Semiconductor Laser Materials

| Material | Useful Wavelength Range |
|---|---|
| GaN/AlGaN | Blue-green |
| ZnSSe | 447–480 nm |
| ZnCdSe | 490–525 nm |
| AlGaInP/GaAs | 620–680 nm |
| Ga0.5In0.5P/GaAs | 670–680 nm |

TABLE 1-continued

Semiconductor Laser Materials

| Material | Useful Wavelength Range |
|---|---|
| GaAlAs/GaAs | 750–870 nm |
| GaAs/GaAs | 904 nm |
| In0.2Ga0.8As/GaAs | 980–1050 nm |
| InGaAsP/InP | 1100–1650 nm |
| PbCdS | 2700–4200 nm |
| PbSSe | 4200–8000 nm |
| PbSnTe | 6500–30000 nm |
| PbSnSe | 8000–30000 nm |

For example, if isolation of frequencies around 800 nm is desired, then GaAlAs/GaAs would be a logical choice. Materials other than those listed in Table 1 may be used to form the semiconductor laser amplifier structure of the invention. Other semiconductor material capable of laser activity could also be used.

The appropriate laser material depends on the wavelength of interest. The semiconductor laser layer can then be etched to give a series of parallel gain blocks with identical or different inter-block distances. In this embodiment, the inter-block coupling is formed by the facets of the adjacent gain blocks and the spacing between the gain blocks. As is well known in the art, the index of refraction differences between a gain block and the spacing, and the spacing and the subsequent gain block, together with the spacing distance, causes a reflection and transmission coefficient, which determines the amount of signal in each gain block.

In an alternate embodiment the inter-block coupling is achieved with a distributed Bragg reflector, which is well known in the art. Here the gain blocks are separated by a refractive index grating structure formed in the laser material. The grating spacing determines the wavelength dependent reflection and transmission coefficients between the gain block. The use of the distributed Bragg reflector offer advantages of lower insertion loss, and higher stability with respect to deviations in the operating environment.

A series of gain blocks is what is known as a lattice. The inter-block spaces may additionally be filled by a vacuum, gas, liquid or solid as long as the filler is at least partially penetrable by light. The gain blocks can then be electrically connected to a current source so the gain blocks can be biased with a DC bias current.

Figure 2:
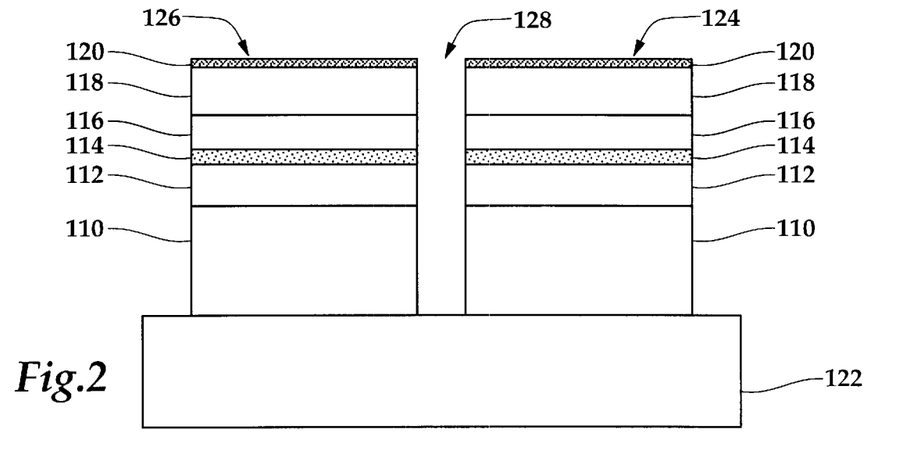
FIG. 2 is a cross sectional view of the active layers within a cleaved coupled cavity semiconductor laser.

FIG. 2 is a cross section view of the active layers within the cleaved coupled cavity (C3) semiconductor laser; an actual structure of the present invention. For one embodiment of a C3 semiconductor laser, an n-type substrate 110 is placed over a base 122. An n-type secondary layer 112 is formed over the n-type substrate 110. Active layer 114 is formed over n-type secondary layer 112 and may consist of the same material as n-type substrate 110. P-type secondary layer 116 is formed over active layer 114 and may be formed from the same material as n-type secondary layer 112. P-type primary layer 118 is formed over p-type secondary layer 116. Metal contacts 120 may be added to the top and bottom of the structure, respectively, in order to run a current through the structure.

A C3 laser is composed of at least two substructures, 124 and 126, with a cavity 128 between them. Depending on how this pair is electrically connected, one substructure may function as an amplifier while the other functions as a filter/sensor. The cavity in the middle of the pair may be joined with other cavities via mirrors, if multiple cleaved coupled cavities are connected into a lattice. This particular configuration allows an optical signal to pass through each section 124 and 126, while extracting and amplifying the wavelengths contained within that signal. This configuration allows a system to have extremely high-speed, wide band, signal extraction capabilities.

Figure 3:
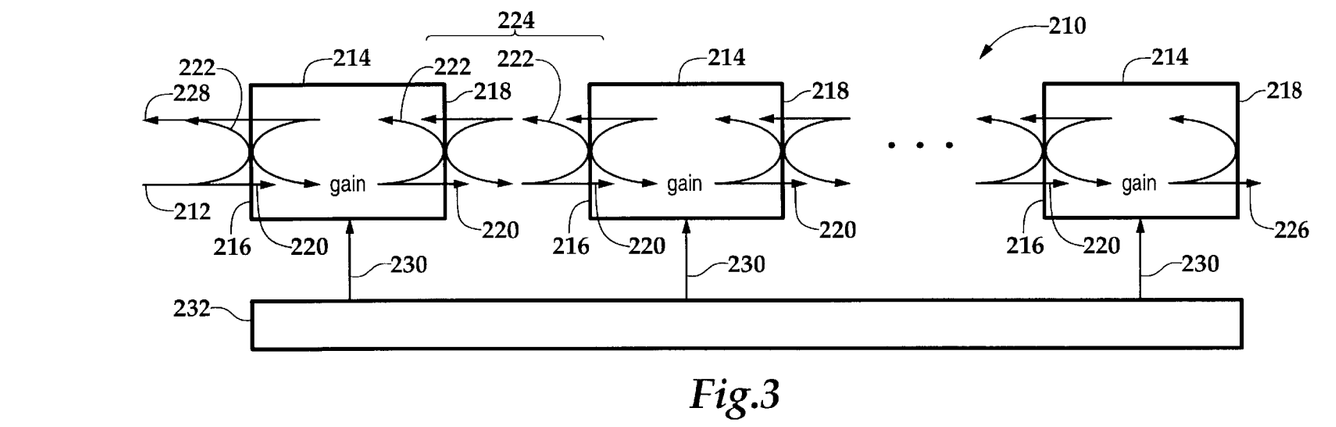
FIG. 3 is a schematic diagram representing an active optical signal processor.

FIG. 3 represents an optical lattice filter 210, wherein optical input signal 212 enters gain block 214 at input interface 216. The input interface 216 is also referred to as an input coupling. Components of optical input signal 212 are either transmitted or reflected at input interface 216. The overall transmissive/reflective properties of the gain block is determined by the amount of injection current running through the gain block 214. A control signal generator, which may include a control signal generator algorithm, determines the amount of injection current and controls the controllable gain block 214. As is well known in the art, the amplification factor of the controllable gain may be measured in decibels, or dbs, by the formula.

$$db\_amplification = 10 \log \frac{Output\_Power}{Input\_Power}$$

For cases where the output power is greater than the input power, the db amplification is greater than zero, while for the cases where the input power is greater than the output power the db amplification is less than zero. In the operation of the optical lattice filter, the db amplification of an individual controllable gain block may be either less than or greater than zero, in accordance with the desired output signal.

Parts of the remaining component signal passing through the interior of gain block 214 may pass through the block unaffected, or will more likely strike an excited laser molecule which in turn emits a second photon of equal wavelength. The transmitted input signal 220 is transmitted through and amplified in gain block 214. Reflected input signal 222 is reflected off output interface 218.

Transmitted input signal 220 then passes through inter-block zone 224 until it contacts the input interface 216 of another gain block, and the process is repeated. The inter-block zone 224 does not necessarily have to be a fixed distance. Inter-block zone 224 may be variable, through the use of pizoelectric crystals for example.

After the transmitted input signal 220 has passed through all of the gain blocks 214, the resultant transmitted output signal 226 can be isolated from an output coupling as illustrated. As transmitted output signal 226 is the sum of all of the transmitted input signals 220, reflected output signal 228 is the sum of all of the reflected input signals 222. The amount of gain in gain block 214 is adjusted by control signal 230 from current source 232.

Input interface 216 and output interface 218 may additionally contain a permanent, partially reflective coating useful for reflecting certain wavelengths of light. Preferably, neither input interface 216 nor output interface 218 will reflect light having the frequency equal to that of transmitted output signal 226, either inherently or through the use of a nonreflective coating. The signal to be isolated will preferably pass directly from optical input signal 212, unidirectionally through to transmitted output signal 226, although minor reflections can be tolerated.

Input interface 216 and output interface 218 provide for input coupling and output coupling into and out of the device. In an optical communications system where the optical signals are routed though optical fibers, is preferable that provision be made to enhance the fraction of power from the fiber into the device. An exemplary way of effecting this is to use a lens or microlens to focus the signal onto the input interface. Alternatively, the fiber may be butt coupled by placement in close proximity to the input interface, as is well known in the art. Similar techniques may be employed on the output interface, for output coupling, and it may be recognized that in some applications, it will be advantageous to output couple the output signal directly into a receiving detector.

Figure 4:
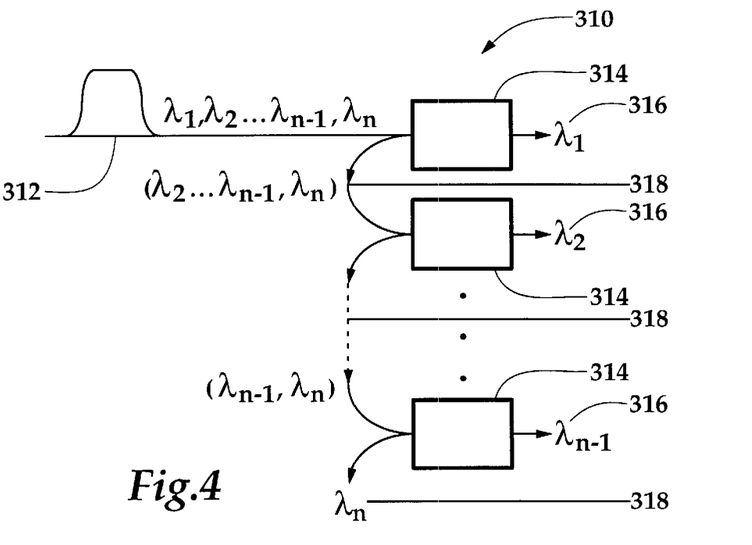
FIG. 4 is a schematic diagram showing an optical signal processor taking a broad-band optical signal, containing a plurality signals of differing wavelengths and separating the plurality of signals into their individual components.

In FIG. 4 a wavelength division demultiplexer 310 separates a multi-component optical input signal 312 into various sub-components. Wavelength division multiplexer 310 comprises a plurality of optical lattice filters 314. Each optical lattice filter 314 is constructed as illustrated in FIG. 3. For each optical lattice filter 314, part of optical input signal 312 passes through as output signal 316 and part is reflected back as reflected signal 318. The reflected signal 318 has a laser line frequency component removed. The removed component exits from one of the transmission outputs 316. Because each lattice filter section may be precisely tuned to have a very sharp roll-off, a wavelength division demultiplexer constructed according to the present invention may be constructed to be what is known as a dense wavelength division demultiplexer. A dense wavelength division demultiplexer uses sharp roll-off filters to allow on the order of 100 or more line frequencies to pass through a single fiber. An optical line frequency is also known as a "color" in wavelength division multiplexing literature. Multiple data streams are modulated onto multiple colors, and these multiple colors are simultaneously transmitted through the fiber. It is the job of the wavelength division demultiplexer to decompose the composite input signal arriving from the fiber into its separate component colors. Each color may then be separately demodulated or forwarded to another connection for transmission.

In accordance with the present invention, the structure of FIG. 4 may be operated as a joint wavelength division demultiplexer and optical switch. Each section 314 of the wavelength division demultiplexer is an optical lattice filter with controllable gains between the stages. As will be discussed hereinafter and as will be specifically discussed in connection with FIG. 10, the ability to control the gains between the lattice stages allows the transfer function of an optical lattice filter to be controllably set. For example, a microprocessor such as a TMS320C50 from Texas Instruments Inc. may be used to calculate and values needed to set the gains to produce a desired transfer function. Also, feedback may be incorporated to control the gains to maintain a desired transfer characteristic. That is, the set of gains may be controllably set to force a given stage 314 in the wavelength division demultiplexer to pass a selected line frequency lambda to the transmission output 316. By changing the gains of a given optical lattice filter 314, a different line frequency will be passed to the output. Hence the wavelength division multiplexer of FIG. 4 may operate as an optical switch when supplied a proper set of gains to reconfigure the system to pass different line frequencies to different outputs. As shown in FIG. 4, an input signal is presented with multiple line frequency components. The gains of a given lattice filter 314 are controllably adjusted to pass a selected line frequency component to its associated transmission output port 316. The control strategies employed to produce this will be discussed in connection with FIGS. 9 and 10.

In the context of a wavelength division multiplexed optical communication system, multiple optical communication signals are sent down a single fiber. Each optical communication signal comprises a laser line frequency onto which is modulated a high-speed data sequence. At the receiving end of the fiber, the wavelength division demultiplexer of FIG. 4 isolates each individual optical communication signal by generating optical filter transfer functions which pass the desired optical communication signal to a given output port 316. Optical switching is thereby enabled by the active optical lattice filters 314 which may each be rapidly and electronically controlled to pass any selected line frequency to its associated transmission output port 316.

Figure 5:
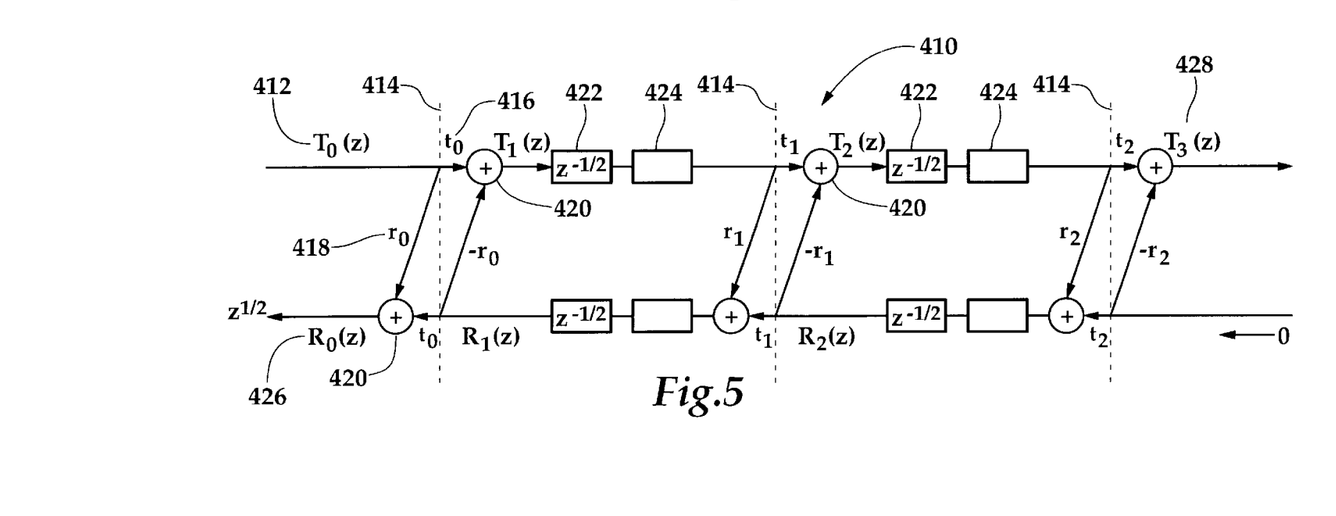
FIG. 5 is a schematic transfer function diagram for an active optical signal processor.

FIG. 5 is a schematic transfer function diagram representing an optical lattice filter 410, wherein optical input signal 412, $T_0(z)$, contacts interface 414. Components of optical input signal 412 are either transmitted as $t_0$ 416 or reflected as $r_0$ 418. $t_0$ is summed with $-r_0$ in summer 420. Transmitted signal $T_1(z)$ passes through blocks 422,424 before being either reflected, $r_1$, or transmitted, $t_1$, at interface 414. The block 422 represents the delay for light to travel from the first interface $(t_0,r_0)$ to the second interface, $(t_1,r_1)$. The block 424 represents an optical gain, for example as implemented with a semiconductor laser amplifier. The blocks 422 and 424 apply to light traveling from left-to-right and from right-to-left in the structure. The left-to-right path is illustrated as the upper path in the figure, and the lower path represents the right-to-left path in the structure. The process is then repeated. The resultant transmitted output signal 428 can be isolated. Transmitted output signal 428 is the sum of all transmitted signals. Reflected output signal 426 is the sum of all of the reflected signals.

Figure 6:
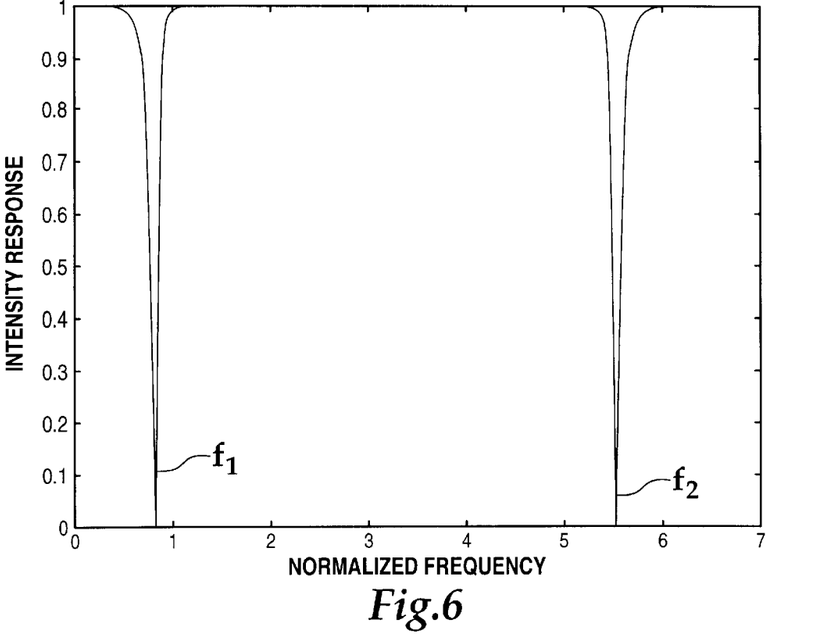
FIG. 6 is a frequency response graph of a notch filter implemented by setting a particular set of transfer and reflection coefficients in one of the lattice filter devices at the normalized frequencies f1 and f2.
Figure 7:
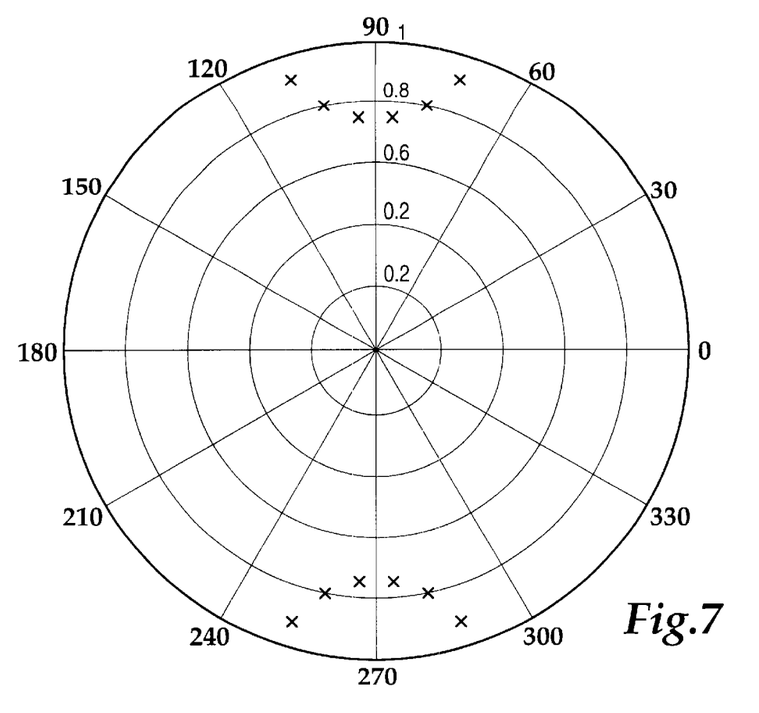
FIG. 7 is a pole zero plot of the notch filter of FIG. 6.

FIG. 6 is a response curve for a notch filter implemented by setting a particular set of transfer and reflection coefficients in one of the lattice-filtered devices at normalizing frequencies $f_1$ and $f_2$. The notch is placed selectively to remove one of the line frequency signals corresponding to a laser beam carrying broad-band information. In the wavelength division demultiplexer 310 illustrated in FIG. 4, the ability to remove a line frequency is tantamount to isolating an information signal carried in a fiber. The notch filter output of FIG. 6 corresponds to the reflection output in the cascade configuration of FIG. 4. The line frequency which is removed exits, for example from the first filter section on path 316. A pole zero plot corresponding to the notch filter of FIG. 6 is depicted in FIG. 7.

Figure 8:
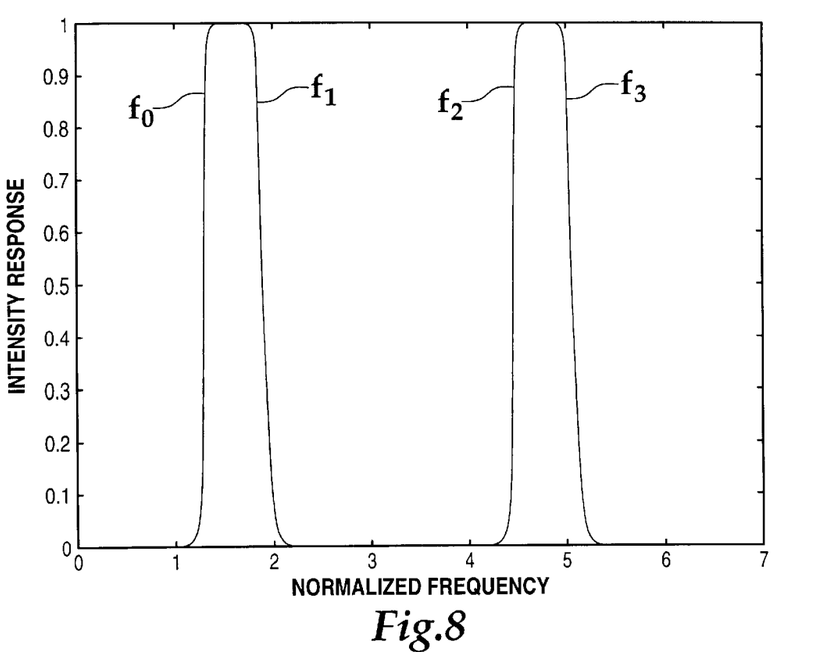
FIG. 8 is a frequency response graph of a flat-topped band pass (Butterworth) filter.

FIG. 8 is a response curve for a flat-topped band pass filter implemented by setting a particular set of transfer and reflection coefficients in one of the lattice-filtered devices at normalizing frequencies $f_0$ $f_1$, $f_2$, and $f_3$.

Our intention is to find the parameters of the model shown in FIG. 5 to implement a transfer function of a k-layer system, $H(z)=T_k(z)/T_0(z)$. From the model, it is clear that the order-recursions are, $$T_{k+1}(z)=t_k Z^{-\frac{1}{2}}T_k(z)-r_k R_{k+1}(z)$$

$$z^{1/2}R_k(z)=r_k Z^{-\frac{1}{2}}T_k(z)+t_k R_{k+1}(z)$$

At this point we will manipulate the order recursions to obtain $(T_{k+1}(z), R_{K+1}(z))$ from $(T_k(z), R_k(z))$. To do this, write $$R_{k+1}(z)=(-z^{-\frac{1}{2}}r_k/t_k)T_k(z)+(z^{1/2}/t_k)R_k(z)$$

and substitute this into the first recursion relation, $$\begin{aligned}T_{k+1}(z) &= z^{-1/2}t_k T_k(z) - r_k[(-z^{-1/2}r_k/t_k)T_k(z) + (z^{1/2}/t_k)R_k(z)]\\ &= z^{-1/2}(t_k + r_k^2/t_k)T_k(z) - (r_k z^{1/2}/t_k)R_k(z)\\ &= z^{-1/2}((t_k^2 + r_k^2)/t_k)T_k(z) - (r_k z^{1/2}/t_k)R_k(z)\\ &= (z^{-1/2}/t_k)T_k(z) - (r_k z^{1/2}/t_k)R_k(z)\end{aligned}$$

Thus we have, $$T_{k+1}(z) = (z^{-1/2}/t_k)T_k(z) - (r_k z^{1/2}/t_k)R_k(z)$$

$$R_{k+1}(z) = (-z^{1/2}r_k/t_k)R_k(z) + (z^{-1/2}/t_k)T_k(z)$$

In matrix form, $$\begin{bmatrix} T_{k+1}(z) \\ R_{k+1}(z) \end{bmatrix} = \frac{z^{1/2}}{t_k}\begin{bmatrix} T_{k+1}(z) \\ R_{k+1}(z) \end{bmatrix}\begin{bmatrix} T_{k+1}(z) \\ R_{k+1}(z) \end{bmatrix}$$

As can be seen from the model, this relation holds for all but the zero'th interface since there are no delays there. At that interface we have, $$\begin{bmatrix} T_1(z) \\ R_1(z) \end{bmatrix} = \frac{1}{t_0}\begin{bmatrix} 1 & -r_0 \\ -r_0 & 1 \end{bmatrix}\begin{bmatrix} T_0(z) \\ R_0(z) \end{bmatrix}$$

Thus we may write, $$\begin{bmatrix} T_{k+1}(z) \\ R_{k+1}(z) \end{bmatrix} = \underbrace{\frac{z^{1/2}}{t_k t_{k-1}\ldots t_1 t_0}}_{\tau_{k,0}}\underbrace{N_k N_{k-1}\ldots N_1 N_0}_{\Phi_{k,0}}\begin{bmatrix} T_0(z) \\ R_0(z) \end{bmatrix}$$

So, $$\begin{bmatrix} T_{k+1}(z) \\ R_{k+1}(z) \end{bmatrix} = \tau_{k,0}\Phi_{k,0}\begin{bmatrix} T_0(z) \\ R_0(z) \end{bmatrix}$$

In order to derive the transfer recursions, we must first define the initial polynomials, $$P_0(z) = 1$$

$$Q_0(z) = 0$$

From here forth, we use $$P_k(z) = P_{k-1}(z) - r_k z^{-1} Q_{k-1}^R(z)$$

$$Q_k(z) = Q_{k-1}(z) - r_k z^{-1} P_{k-1}^R(z)$$

where the superscript R denotes the reverse polynomial, that is $$P_k^R(z) = z^{-k} P_k(z^{-1})$$

Now note that $$P_1(z) = P_0(z) - r_1 z^{-1} Q_0^R(z) = 1$$

$$Q_1(z) = Q_0(z) - r_1 z^{-1} P_0^R(z) = -r_1 z^{-1}$$

also, $$P_1^R(z) = z^{-1} \text{ and } Q_1^R(z) = -r_1$$

So that $$\begin{bmatrix} P_1^R(z) & Q_1^R(z) \\ Q_1(z) & P_1(z) \end{bmatrix} = \begin{bmatrix} z^{-1} & -r_1 \\ -r_1 z^{-1} & 1 \end{bmatrix} = N_1$$

From here we can see that $$N_1 N_2 = \begin{bmatrix} P_1^R(z) & Q_1^R(z) \\ Q_1(z) & P_1(z) \end{bmatrix}\begin{bmatrix} z^{-1} & -r_2 \\ -r_2 z^{-1} & 1 \end{bmatrix} = \begin{bmatrix} P_2^R(z) & Q_2^R(z) \\ Q_2(z) & P_2(z) \end{bmatrix}$$

Thus we may use these recursions to write $$N_k \ldots N_1 = \begin{bmatrix} P_k^R(z) & Q_k^R(z) \\ Q_k(z) & P_k(z) \end{bmatrix} \triangleq \Phi_{k,1}$$

This is the transfer matrix from layer 1 to layer k.

Now assume that we excite the device from the left with an input waveform, $T_0(z)$. We will study the transfer functions from $T_0(z)$ to $T_{k+1}(z)$ and from $T_0(z)$ to $R_0(z)$ subject to the boundary condition that $R_{k+1}(z) = 0$. This is the case depicted above. We can incorporate the boundary information by writing $$\begin{bmatrix} T_{k+1}(z) \\ 0 \end{bmatrix} = \tau_{k,0}\begin{bmatrix} P_1^R(z) & Q_1^R(z) \\ Q_1(z) & P_1(z) \end{bmatrix}\begin{bmatrix} z^{-1} & -r_2 \\ -r_2 z^{-1} & 1 \end{bmatrix}\begin{bmatrix} T_0(z) \\ R_0(z) \end{bmatrix}$$

$$= \tau_{k,0}\begin{bmatrix} P_1^R(z) & Q_1^R(z) \\ Q_1(z) & P_1(z) \end{bmatrix}\begin{bmatrix} z^{-1} & -r_2 \\ -r_2 z^{-1} & 1 \end{bmatrix}\begin{bmatrix} T_0(z) \\ R_0(z) \end{bmatrix}$$

or, $$T_{k+1}(z) = \tau_{k,0}[P_k^R(z)(T_0(z) - r_0 R_0(z)) + Q_k^R(z)(R_0(z) - r_0 T_0(z))]$$

$$T_{k+1}(z) = \tau_{k,0}[(P_k^R(z) - r_0 Q_k^R(z))T_0(z) + (Q_k^R(z) - r_0 P_k^R(z))R_0(z)]$$

also, $$0 = [Q_k(z) - r_0 P_k(z)]T_0(z) + [P_k(z) - r_0 Q_k(z)]R_0(z)$$

$$R_0 = -(Q_k(z) - r_0 P_k(z))T_0(z)/(P_k(z) - r_0 Q_k(z))$$

Thus, $$\begin{aligned}T_{k+1}(z) &= \tau_{k,0}[(P_k^R(z) - r_0 Q_k^R(z)) + (Q_k^R(z) - r_0 P_k^R(z))(Q_k(z) -\\ &\quad r_0 P_k(z))/(P_k(z) - r_0 Q_k(z))]T_0(z)\\ &= \tau_{k,0}[((P_k^R(z) - r_0 Q_k^R(z))(P_k(z) - r_0 Q_k(z)) + (Q_k^R(z) -\\ &\quad r_0 P_k^R(z))/(Q_k(z) - r_0 P_k(z)))/(P_k(z) - r_0 Q_k(z))]T_0(z)\\ &= \tau_{k,0}[(P_k^R(z)P_k(z) - r_0 P_k^R(z)Q_k(z) - r_0 Q_k^R(z)P_k(z) +\\ &\quad r_0^2 Q_k(z)Q_k(z) - Q_k^R(z)Q_k(z) + r_0 Q_k^R(z)P_k(z) +\\ &\quad r_0 P_k^R(z)Q_k(z) + r_0 P_k^R(z)Q_k(z)/(P_k(z) - r_0 Q_k(z))]T_0(z)\\ &= \tau_{k,0}[(P_k^R(z)P_k(z) - Q_k^R(z)Q_k(z))(1 - r_0^2)/(P_k(z) -\\ &\quad r_0 Q_k(z))]T_0(z)\end{aligned}$$

Note that, $$P_k^R(z)P_k(z) - Q_k^R(z)Q_k(z) = det\begin{bmatrix} P_1^R(z) & Q_1^R(z) \\ Q_1(z) & P_1(z) \end{bmatrix} = det(N_k \ldots N_1) =$$

-continued $$\det N_k \ldots \det N_1$$
$$= (z - r_k^2 z)(z - r_{k-1}^2 z) \ldots (z - r_1^2 z)(1 - r_0^2)$$
$$= z^k[(1 - r_k) \ldots (1 - r_0)] \cdot [(1 + r_k) \ldots (1 + r_0)]$$
$$T_{k+1}(z) = [z^{k/2}((1 + r_k) \ldots (1 + r_0))/(P_k(z) - C_0 Q_k(z))] \cdot T_0(z)$$
$$\overset{\Delta}{=} \tau_{k,0}/A(z)$$

Further, let us write, $$R_0(z) = -(Q_k(z) - r_0 P_k(z))/(P_k(z) - r_0 Q_k(z))$$
$$= -B_k(z)/A_k(z)$$

That is $$A_k(z) = P_k(z) - r_0 Q_k(z)$$

$$B_k(z) = Q_k(z) - r_0 P_k(z)$$

Now we can obtain some recursions here, $$A_k(z) = P_k(z) - r_0 Q_k(z)$$
$$= (P_{k-1}(z) - r_k z^{-1} Q_k^R(z)) - r_0(Q_{k-1}(z) - r_k z^{-1} P_k^R(z))$$
$$= (P_{k-1}(z) - r_0 Q_{k-1}(z)) - r_k z^{-1}(Q_{k-1}^R(z) - r_0 P_{k-1}^R(z))$$
$$= A_{k-1}(z) - r_k z^{-1} B_{k-1}^R(z)$$

Likewise, $$B_k(z) = Q_k(z) - r_0 P_k(z)$$
$$= (Q_{k-1}(z) - r_k z^{-1} P_{k-1}^R(z)) - r_0(P_{k-1}(z) - r_k z^{-1} Q_{k-1}^R(z))$$
$$= (Q_{k-1}(z) - r_0 P_{k-1}(z)) - r_k z^{-1}(P_{k-1}^R(z) - r_0 Q_{k-1}^R(z))$$
$$= B_{k-1}(z) - r_k z^{-1} A_{k-1}^R(z)$$

That is, $$\begin{bmatrix} A_k^R(z) & B_k^R(z) \\ B_k(z) & A_k(z) \end{bmatrix} = \begin{bmatrix} z^{-1} & -r_k \\ -r_k z^{-1} & 1 \end{bmatrix} \begin{bmatrix} A_{k-1}^R(z) & B_{k-1}^R(z) \\ B_{k-1}(z) & A_{k-1}(z) \end{bmatrix}$$

Recall that Cramer's rule gives

$$\begin{bmatrix} a & c \\ d & b \end{bmatrix} = \frac{1}{ab - cd} \begin{bmatrix} b & -c \\ -d & a \end{bmatrix}$$

So that we may write the step-down recursion as, $$\begin{bmatrix} A_{k-1}^R(z) & B_{k-1}^R(z) \\ B_{k-1}(z) & A_{k-1}(z) \end{bmatrix} = \frac{1}{z - r_k^2 z} \begin{bmatrix} 1 & r_k \\ r_k z & z \end{bmatrix} \begin{bmatrix} A_k^R(z) & B_k^R(z) \\ B_k(z) & A_k(z) \end{bmatrix}$$

Now that we start out with a valid $A_k(z)$ and $B_k(z)$, we can get down to a valid system parameterization. The problem is that we do not know $B_k(z)$, but only $A_k(z)$.

Consider the case where $r_0 = -1$ and the signal is injected in E to the right of $r_0$ This is the celebrated case of the so-called marine seismogram. In this case we can write our system block diagram Here $r_0 = -1$ so that $$A_k(z) = P_k(z) + Q_k(z)$$

$$B_k(z) = Q_k(z) + P_k(z)$$

i.e., $$A_k(z) = B_k(z)$$

Hence for this case, we always know $B_k(z)$. Our desire is to use this simple case to come up with a design procedure for the more general case.

But before doing this, let us customize our recursions to this special case. In so doing we will make theoretical connections to the standard lattice design procedure. First note that $$A_k(z) = P_k(z) + Q_k(z)$$
$$= (P_{k-1}(z) - r_k z^{-1} Q_k^R(z)) + (Q_{k-1}(z) - r_k z^{-1} P_{k-1}^R(z))$$
$$= (P_{k-1}(z) + Q_{k-1}(z)) - r_k z^{-1}(P_{k-1}^R(z) + Q_{k-1}^R(z))$$
$$= A_{k-1}(z) - r_k z^{-1} A_k^R(z)$$

So the $A_k(z)$ polynomial follows a simpler auto-recursion. This is simpler than the $(P_k(z), Q_k(z))$ and $(A_k(z), B_k(z))$ pairs which follow a coupled recursion.

Let us analyze our recursion relations with $A_k(z) = B_k(z)$. We have, $$\begin{bmatrix} A_k^R(z) & A_k^R(z) \\ A_k(z) & A_k(z) \end{bmatrix} = \begin{bmatrix} z^{-1} & -r_k \\ -r_k z^{-1} & 1 \end{bmatrix} \begin{bmatrix} A_{k-1}^R(z) & A_{k-1}^R(z) \\ A_{k-1}(z) & A_{k-1}(z) \end{bmatrix}$$

Throwing out the redundant information, $$\begin{bmatrix} A_k^R(z) \\ A_k(z) \end{bmatrix} = \begin{bmatrix} z^{-1} & -r_k \\ -r_k z^{-1} & 1 \end{bmatrix} \begin{bmatrix} A_{k-1}^R(z) \\ A_{k-1}(z) \end{bmatrix}$$

To move to a more familiar form, write, $$\begin{bmatrix} A_k(z) \\ A_k^R(z) \end{bmatrix} = \begin{bmatrix} 1 & -r_k z^{-1} \\ -r_k & z^{-1} \end{bmatrix} \begin{bmatrix} A_{k-1}(z) \\ A_{k-1}^R(z) \end{bmatrix}$$

Now define the backward polynomial $$\hat{B}_k(z) = z^{-1} A_k^R(z) = z^{-(k-1)} A_k(z^{-1})$$

so that we can write $$\begin{bmatrix} A_k(z) \\ \hat{B}_k^R(z) \end{bmatrix} = \begin{bmatrix} 1 & -r_k \\ -r_k z^{-1} & z^{-1} \end{bmatrix} \begin{bmatrix} A_{k-1}(z) \\ \hat{B}_{k-1}(z) \end{bmatrix}$$

Note we could have derived this as $$A_k(z) = A_{k-1}(z) - r_k \hat{B}_{k-1}(z)$$

$$\hat{B}_{k-1}(z) = z^{-(k+1)} A_k(z^{-1})$$

$$Z\hat{B}_{k-1}(z) = z^{-k} [A_{k-1}(z^{-1}) - r_k A_{k-1}(z)]$$

$$= \hat{B}_{k-1}(z) - r_k A_{k-1}(z)$$

$$\hat{B}_{k-1}(z) = z^{-1} \hat{B}_{k-1}(z) - r_k z^{-1} A_{k-1}(z)$$

Hence we can arrive at the lattice equations as a special case of the more general recursion, or can use the standard approach.

As we see, the effect of a perfect reflector is to convert the coupled recursion equations into a single forward-backward auto-recursion. This simplification mitigates the need to find an appropriate $B_k(z)$. It also collapses the dimension of the problem so that $B_k(z)$ cannot be recovered from this procedure.

Now assume we inject a signal in such a way as when the reflected signal gets back, none turns around to go back into the system. That is,

$$r_0 = 0$$

So, $$A_k(z) = P_k(z) - r_0 Q_k(z) = P_k(z)$$

$$B_k(z) = Q_k(z) - r_0 P_k(z) = Q_k(z)$$

In essence we have a layer-peeled here. Now we have the model (open loop),

This system has a transfer function such that if the final $r_0$ is added, we will get the desired $A_k(z)$ and $B_k(z)$ functions. This model gives the $P_k(z)$ and $Q_k(z)$ functions from the $A_k(z)$ specification.

In the following discussion we will show how to directly find the set of all valid $B_k(z)$s for a given $A_k(z)$ specification. We will use the original system directly instead of either of the two above simplified systems.

At this point we know how to solve the problem given $A_k(z)$ and $B_k(z)$. Here we show how to find all possible $B_k(z)$s for a given $A_k(z)$.

Let us assume we have a valid $B_k(z)$ and see what it must satisfy. First note we can write $$\begin{bmatrix} A_k^R(z) & B_k^R(z) \\ B_k(z) & A_k(z) \end{bmatrix} = \begin{bmatrix} P_k^R(z) & Q_k^R(z) \\ Q_k(z) & P_k(z) \end{bmatrix} \begin{bmatrix} 1 & -r_0 \\ -r_0 & 1 \end{bmatrix}$$

$$\prod_{i=0}^{k} N_k = \Phi_{k,0}$$

So, $$det \begin{bmatrix} A_k^R(z) & B_k^R(z) \\ B_k(z) & A_k(z) \end{bmatrix} = \left( \prod_{i=0}^{k} N_k \right) = \prod_{i=0}^{k} det N_k$$

or, $$A_k^R(z) A_k(z) - B_k^R(z) B_k(z) = (z - r_k^2 z) \ldots (z - r_1^2 z)(1 - r_0^2) = z^k (1 - r_k^2) \ldots (1 - r_0^2)$$

So, $B_k(z)$ must satisfy, $$B_k(z) B_k^R(z) = A_k(z) A_k^R(z) - z^k (1 - r_k^2) \ldots (1 - r_0^2)$$

or $$B_k(z) B_k^R(z) = A_k(z) A_k^R(z) - z^k (t_k^2 \ldots t_0^2)$$

Thus we can solve the above equation of $B_k(z)$ with the net transmission loss of the structure as a design parameter. Of course, the transmission loss must be selected within a physical realizable range in order to obtain a stable realization.

Finally, not that the above equation represents, a family of solutions for $B_k(z)$s. The equation amounts to a factorization problem given that $A_k(z)$, and hence $A_k^R(z)$, as well as $(t_0 \ldots t_k)$ are specified design parameters. After that, the right hand side must be factored into a product of a forward and reverse polynomial.

The factorization problem is to find $B_k(z)$ by factoring according to $$B_k(z)B_k^R(z) = A_k(z)A_k^R(z) - (t_0 \ldots t_k)^2 z^k$$

This problem can be solved quite easily after making a few observations. First, the multiplication of two polynomials is equivalent to convolving the coefficients. Second, $A_k(z)A_k^R(z)$ can be formed by reversing the coefficients of $A_k(z)$ and then convolving this reversed sequence with the $A_k(z)$ coefficients. Third, $A_k(z)A_k^R(z)$ can be formed by correlating the coefficients of $A_k(z)$ with themselves—$A_k(z)A_k^R(z)$ is an auto-correlation function. Fourth, $A_k(z)$ is of degree k, so $A_k(z)A_k^R(z)$ is of degree 2 k+1, so the $(t_0 \ldots t_k)z^k$ term adds to the center term. Fifth, $A_k(z)A_k^R(z) + (t_0 \ldots t_k)z^k$ is itself an auto-correlation function, but with a different zero-lag term than $A_k(z)A_k^R(z)$. Sixth, $A_k(z)A_k^R(z) + t_0 \ldots t_k)z^k$ retains the symmetry properties and may be factored as $B_k(z)B_k^R(z)$. Finally, $B_k(z)$ and $B_k^R(z)$ have roots that are mirror images with respect to the unit circle. With these observations, we can obtain $B_k(z)$ factorizations as follows:

Factorization Algorithm

Step 1: form $\psi(z) = A_k(z)A_k^R(z) - (t_0 \ldots t_k)z^k$

Step 2: factor $\psi(z) = \prod_{i=0}^{k}(z - P_i) \cdot \prod_{i=0}^{k}(z - \hat{P}_i)$, where $|P_i| < 1$ and $|\hat{P}_i| > 1$

Step 3: set $B_k(z) = \prod_{i=0}^{k}(z - P_i)$

Note that this gives the minimum-phase solution.

The above algorithm selects the minimum-phase solution, although this is somewhat arbitrary. Note that any valid $B_k(z)$ can be selected by picking any set of k roots such that none are mirror images of each other.

For example

In a preferred embodiment, the control signal generator generates control signals to set the gains associated with the gain blocks in the system. The control signal generator preferably sets the gains of the gain blocks to produce a set of reflection and transmission coefficient parameters to achieve a specified transfer function in accordance with the above mathematics. That is, for each lattice section, the control signal generator applies an appropriate control signal to set a gain in each gain block so as to produce a net reflection and transmission coefficient for the structure. In a lossless passive structure, the square of a reflection coefficient plus the square of a transmission coefficient associated with a given interface is equal to one. In a physical passive structure, the square of a reflection coefficient plus the square of a transmission coefficient associated with a given interface is less than one. In the active optical signal processor according to the present invention, the square of a given reflection coefficient plus the square of the associated transmission coefficient may be greater than one. As would be obvious to those trained in the art, there is a clear mathematical relationship between the passive transmission and reflection coefficients and those for the active device taught here, given the logical mathematical transformation of including the gain of the gain block into the reflection and transmission coefficient in the above equations. Hence making an adjustment in the gain block is equivalent to making an adjustment of the reflection and transmission coefficients. This allows losses to be compensated and keeps a signal from becoming overly attenuated as it passes through the structure. Thus, the control signal generator applies a voltage or current control signal in order to maintain a gain in a given lattice section. This effectively allows the reflection and transmission coefficients of a given lattice section to be altered. The control signal generator is preferably implemented as a control loop which maintains gain values to achieve a desired output signal for a given input signal, or to achieve an advantageous filter response in accordance with the foregoing mathematics. The control algorithm uses to maintain the gains at their optimum values may also be encoded on a microprocessor or a digital signal processor, such as a TMS320C50 from Texas Instruments Inc, Dallas, Tex. In the preferred embodiment, a digital-to-analog converter is used to convert a digital control signal produced by the TMS320C50 into a control voltage which is coupled control the gain of a gain block within the lattice structure.

As is known to skilled artisans, reflection coefficients may be altered within lattice digital filter structures to minimize the power in an error function using as gradient descent algorithm such as the least mean squares adaptive filter algorithm. Specifically, the gradient adaptive lattice algorithm may be used to adaptively control a set of reflection coefficients to optimize performance by minimizing a prediction error function. For example, the gradient adaptive lattice and least mean squares algorithms may be implemented in the TMS320C50 to control the reflection and transmission coefficients in the optical lattice filter to produce a similar effect for the processing of optical signals. To implement these algorithms, at least one analog-to-digital converter is used to sample an error signal used to measure performance of the system. In other embodiments, one or more analog-to-digital converters may be used to measure the gain and reflection coefficients associated with each gain block and interface to allow a servo control loop to maintain parameters at specified values in accordance with the aforementioned mathematical models.

Figure 9:
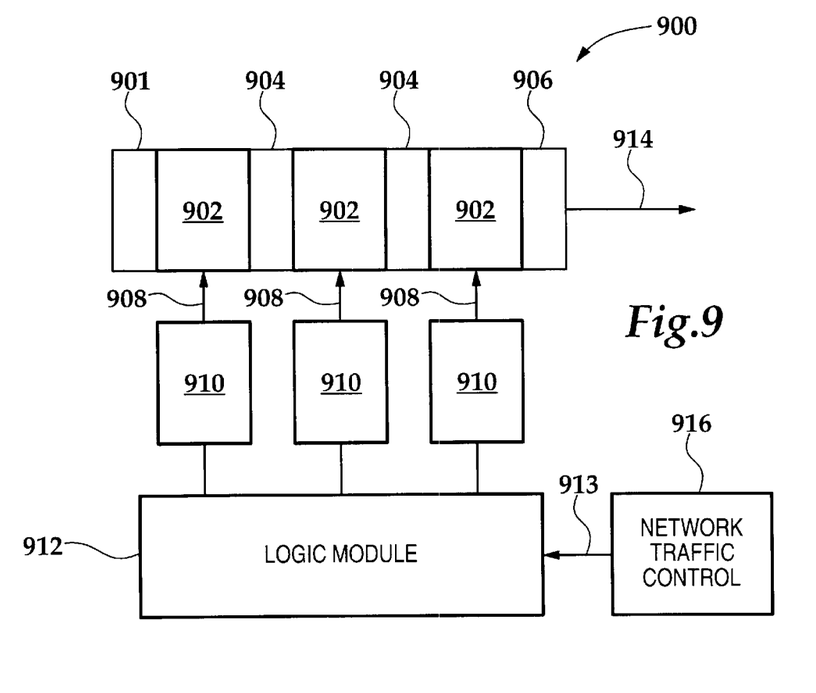
FIG. 9 is an optical signal processing apparatus including a control signal generator used to control an optical transfer function.

In FIG. 9 is a schematic of the active optical lattice filter 900 including a control logic block 912 and a set of control signal generators 910. The device may be controlled to act as an adjustable optical filter or as a tunable oscillator. Gain blocks 902 are connected to inter-block coupling elements 904 to form a cascade of gain blocks as disclosed above. At the end of the cascade is an output coupling element 906. An input coupling 901 is also present. When the device is operated as an optical filter, the input coupling 901 may have a selected transmission and reflection coefficient as previously described. When operated as a tunable oscillator, the input coupling 901 is preferably configured so that the reflection coefficient of the input coupling 901 is set to unity. In a preferred embodiment these inter-block coupling elements are distributed feedback structures also known in the art as Bragg gratings. The gain blocks are independently controlled by control signals 908. In a preferred semiconductor laser embodiment these control signals are preferably injection currents. In this example, the control signals are generated by control signal generators 910 connected to a logic block 912. Various equivalent structures may be used to generate the control signals to alter the gains. These include a single lumped generator which generates multiple control signals at once, control signal generators which generate control voltages, and control signal generators which pass digital values. The control signal generators 910 preferably provide an appropriate signal to interface with and control the gains in the gain blocks 902. The logic block 912 determines, according to an algorithm, that the correct set of control signals to send to the gain blocks 902. When configured as a tunable oscillator, these gain values cause the system to produce an output signal 914 at a desired, precisely determined wavelength. The logic block 912 may be implemented, for example, using a TMS320C50 digital signal processor from Texas Instruments, Inc. The control algorithm is preferably a table look-up whereby a desired frequency value is specified, for example, by a network traffic controller 916 over a path configuration control input 913. The logic module 912 preferably looks up a set of precomputed gain values to generate the desired line frequency or transfer function, depending on the application. Changing the control signals tunes or adjusts the wavelength of output signal 914. If the net control signal levels are sufficiently high, the gain in the active lattice filter described here can also be exploited to produce a laser oscillator. Note in some applications the network traffic controller 916 may more generally represent any source of higher level commands. In this context, the source of commands 916 may itself be embedded into the logic 912 or may come from an external source other than a network layer or link layer communication protocol.

When the structure 900 is operated as a tunable oscillator, particularly if distributed feedback Bragg reflectors are used as the coupling elements, the oscillator will have a very high quality factor, or frequency precision. Further, the parameters of the active optical lattice filter may be adjusted to provide a frequency controlled laser signal. A tunable precise laser frequency generator is useful for providing a source color in a dense wavelength division multiplexer in an optical communication system. A source color is also known as an optical line frequency, and corresponds to a laser signal of a specified frequency. A broad-band data sequence is modulated onto this laser signal preferably using a lithium niobate, or an electroabsorption modulator. A laser signal onto which is modulated a data sequence is an optical communication signal. A wavelength division multiplexer is a coupler which combines different optical line frequencies in order to propagate them in parallel down a single optical fiber channel. The wavelength division demultiplexer as discussed in connection with FIG. 4 is used to separate the optical line frequencies at the receiving end of the optical communication system.

A control program may be inserted into the logic block 912 to enable optical switching. In this case, the path configuration control input 913 interposed between the network traffic control device 916 and the logic module 912. The network traffic control device 916 is preferably implemented in software or hardware as a part of a link layer or network layer communication protocol stack. The coupling 913 is used to transfer high level network switching and configuration commands relating to the switching of colors to output ports in an optical communications switch. The information received over the coupling 913 is a path configuration control signal which indicates to the control logic 912 to apply a given set of gain values to produce a given transfer function in each optical lattice filter 902, 904. As discussed below, each controlled optical signal processing structure 900 may be used to generate controlled line frequencies in a wavelength division multiplexer. Alternatively, the structure 900 may be operated as an optical lattice filter. In this case a set of such optical lattice filters are preferably configured as a wavelength division demultiplexer as illustrated in FIG. 4. The control logic module preferably performs a table look-up to convert the path configuration control signal into a set of control signal values 908 to apply to the gain blocks 902. The set of control signals 908 are thus applied to each optical lattice filter in the wavelength division demultiplexer in response to the path configuration control signal. By rapidly switching the gains from a first set of values to a second set of values, a different mapping of colors to output ports is produced. The logic module 912 may also preferably include a servo algorithm to continuously tune the system to maintain stable frequencies and transfer functions over a broad range of operating conditions. Servo control algorithms and adaptive filter adjustment algorithms are by now known to skilled artisans.

The present invention may also be used in the transmitter portion of a fiber connection to enable optical switching. In the fiber channel transmitter, selected line frequencies may be generated by properly setting gain values in a given optical lattice filter. A look-up table may be used to look up known sets of gain values which cause the optical lattice filters to generate specified line frequencies. Hence a modulator structure is configured which modulates data onto a line frequency component generated by the optical lattice filter of the present invention. That is, a given data sequence may be modulated onto different line frequencies as a function of time. If a standard wavelength division demultiplexer is used at the receiving end of the fiber, at any given instant, the given data sequence will be routed to an output port as a function of the line frequency. Since the line frequency changes with time, the output port onto which data is routed also controllably changes as a function of time. This is the basic function of an optical switch.

Alternatively, if in the transmitter, a given data channel is always modulated onto a given line frequency, the switching function may be implemented in the receiver side of the connection. In this case, the structure of FIG. 4 and FIG. 9 is used as a joint wavelength division demultiplexer and switching system. The logic program operating in the logic block 912 sets the gains of the optical lattice filters to perform optical switching as discussed in connection with FIG. 4. Depending on the settings of the gains in each of the optical lattice stages, a given line frequency will be routed to one port or another. As the gains of the optical lattice filters are rapidly altered under program control, a given data signal modulated onto a given line frequency will be routed to different output ports. Again, this structure enables optical switching. The control logic 912 is preferably implemented using a processor such as the Texas Instruments TMS320C50. The set of gains needed to switch the set of input line frequencies to a given set of output ports is preferably stored in a look-up table. A network level traffic router operating at a higher layer of a communication protocol such as layer 2 or layer 3 provides switching configuration command signals to the logic block 912. In the preferred embodiment, the logic block 912 accepts the switching configuration command signal, performs a table look-up, and generates the set of gain control signals needed to configure the joint wavelength division demultiplexer and switching system to route the set of line frequency components to the specified set of output ports. A servo loop is also preferably implemented in the logic block 912 which adjusts the gains on an on-going basis to minimize error correction coding related error rates or other quality measures for each channel. This compensates for temperature drifts, drifts in the source color frequencies, and other factors. As the gains are adjusted, the control signal values in the look-up tables are also preferably updated as well. Servo loops and adaptive signal processing algorithms used to minimize error functions are well known in the art. For example the Least Means Squares (LMS) algorithm and its derivatives, or the Recursive Least Squares (RLS) algorithms may be applied in addition to various controllers such as Proportional, Integral, Differential (PID) controllers.

Figure 10:
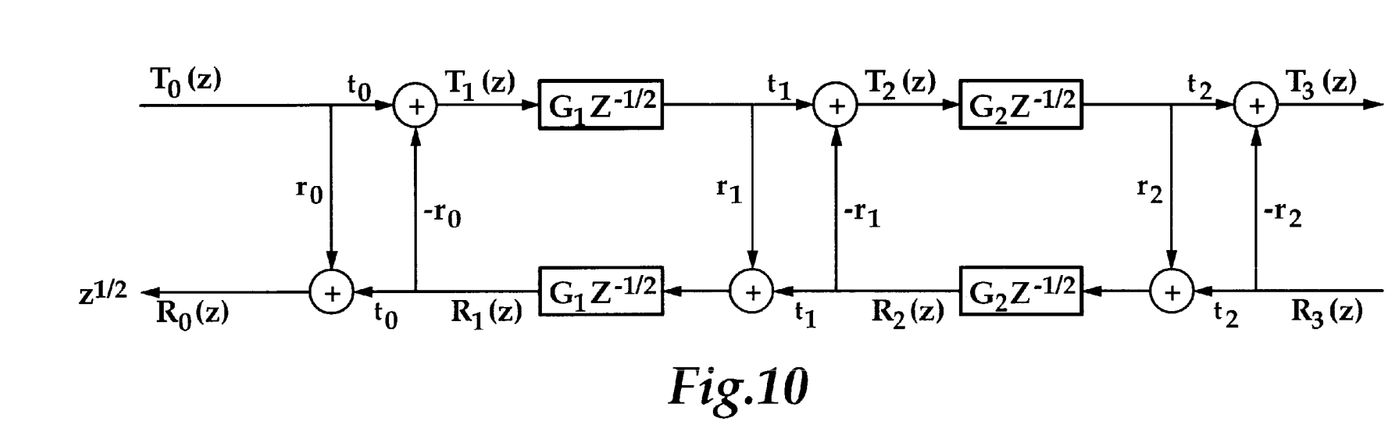
FIG. 10 is a mathematical model of an optical lattice filter with variable gains explicitly shown.

Referring now to FIG. 10, an optical signal processing mathematical model is shown illustrating an example of an active optical lattice filter according to the present invention. This figure is similar to FIG. 5, but the gain and delays have been lumped together to specifically call out the existence of the gains. The mathematical derivations presented thus far illustrate the case where all of the gain values, G1, G2, ... are set to unity. In the example of FIG. 10, there are two gain values, G1, and G2. In general any number of stages may be cascaded by repeating the pattern shown, so structures may be produced with varying numbers of gain values. In the illustrative example, G1 and G2 represent free parameters controlled as discussed in connection with FIG. 9. A set of fixed nominal reflection parameters $\{(t_0,r_0), (t_1,r_1), (t_2,r_2)\}$ encoded into the hardware structure represented by FIG. 10. If the gain values G1 and G2 are set to unity, the system has a second order transfer function calculated in accordance with the foregoing mathematics. For example, given the nominal set of parameters, gives rise to a transmission transfer function $Ht_1(z)$. The objective of having variable gains is to be able to move the transmission transfer function to a new operating point, i.e., $Ht_2(z)$. That is, given the set of fixed nominal reflection parameters, different transfer functions may be synthesized by moving the gain values from the gain-setting (G1,G2) to (G1',G2'). Using the foregoing mathematical modeling techniques, the transfer function of the example system of FIG. 10 is given by:

$$H_t(2) = \frac{t_0 t_1 t_2 G_1 G_2 z^{-1}}{1 - (G_1^2 r_0 r_1 + G_2^2 r_1 r_2) z^{-1} + G_1^2 G_2^2 r_0 r_2 z^{-2}}$$

Hence it can be seen that altering the gain values alters the transfer function and frequency response of the system. The gain-values needed to provide a desired transfer function may be found analytically, numerically, or via on-line adaptation using methods well known to those skilled in the art.

While this invention has been described and referenced to illustrative embodiments, the description is not intended to be construed in a limiting sense. Various modifications and combinations of illustrative embodiments as well as other embodiments and inventions will become apparent to those skilled in the art upon reference or description. It is, therefore, intended that appended claims encompass any such modifications or embodiments.

What is claimed is:

1. Optical signal processing apparatus comprising:
   a plurality of controllable gain blocks, each one of said gain blocks comprising an electrode and an associated controllable gain, each said electrode being coupled to a control signal generator, and each said electrode being operative to receive a control signal which controls said associated controllable gain;
   an inter-block coupling between each of said gain blocks, said inter-block coupling operative to provide partial reflection and partial transmission of an optical signal between each of said gain blocks; and
   an output coupling coupled to one of said gain blocks, wherein said output coupling couples an output signal from said apparatus.

2. The apparatus according to claim 1, wherein said gain block is a semiconductor laser amplifier.

3. The apparatus according to claim 1, wherein said inter-block coupling is a distributed feedback Bragg reflector.

4. The apparatus according to claim 1, wherein said control signal generator, sends a first control signal to one of said gain blocks and a second control signal to another of said gain blocks.

5. The apparatus according to claim 4, wherein said control signal generator sends a set of signals to cause said apparatus to produce optical oscillations so as to produce said output signal, and said output signal comprises a tunable line frequency.

6. The apparatus according to claim 5, wherein said apparatus is a wavelength division multiplexer, and a data signal is modulated onto said tunable line frequency to produce an optical communication signal.

7. The apparatus according to claim 5, wherein said apparatus is an optical communication switch, said optical communication switch further comprising:
   a path configuration control input coupled to a network traffic control device, said path configuration control input operative to receive a path configuration control signal; and
   a control program coupled to said path configuration control input and to said control signal generator, said control program operative to direct said control signal generator to apply a first set of control signals to said gain blocks to produce said line frequency output at a first carrier frequency, and in response to a new value of said path configuration control signal, to direct said control signal generator to apply a second set of control signals to said gain blocks to produce said line frequency output at a second carrier frequency, whereby a data signal is modulated onto said tunable line frequency output to produce an optical communication signal, and said optical communication signal is thereby switched from said first carrier frequency to said second carrier frequency.

8. The apparatus according to claim 1, further comprising:
   an input coupling which couples said optical signal into said apparatus, whereby said apparatus filters said input optical signal to produce said output signal.

9. The apparatus according to claim 8, wherein said output coupling is a transmission output coupling, said apparatus further comprising a second output coupling, said second output coupling being a reflection output coupling, said reflection output coupling being the same as said input coupling, whereby an input signal enters said apparatus via said input coupling and different components of said input signal exit said apparatus via said transmission and reflection output couplings.

10. The apparatus according to claim 9, wherein said apparatus is a wavelength division demultiplexer, said controllable gains being controlled to cause said apparatus to pass a first line frequency component of said optical input signal to said transmission output coupling, and at least one other line frequency component of said optical signal to said reflection output coupling.

11. The apparatus according to claim 9, wherein said apparatus is a joint wavelength division demultiplexer and optical switching system, said controllable gains being controlled to cause said apparatus to pass a first line frequency component of said optical input signal to said transmission output coupling, and at least one other line frequency component of said optical signal to said reflection output coupling, and said gains being controllably altered to under program to selectively pass a first line frequency component out of said transmission coupling and at a later time, in response to a switching command signal, to selectively pass a second line frequency component out of said transmission output.

12. A method of optical signal processing, the method comprising the steps of:

amplifying an optical signal in a first gain block and amplifying said optical signal in a second gain block, wherein said first gain block is coupled in cascade to said second gain block, said coupling providing partial reflection and partial transmission of said optical signal between said gain blocks;

controlling a first gain associated with said first gain block and controlling a second gain associated with said second gain block, wherein said controlling is performed by applying a first control signal and a second control signal; and transmitting at least one output signal comprising partial transmission signals from said first gain block and said second gain block, wherein said gains are controllably set to cause said optical signal processing to be governed by a first transfer function which causes said output signal to comprise a first line frequency component, and at a later time in response to a switching control signal, to controllably set said gains to cause said optical signal processing to be governed by a second transfer function which causes said output signal to comprise a second line frequency component.

13. An optical signal processor comprising:

a first gain block and a second gain block, wherein said first gain block is coupled in cascade to said second gain block, said coupling providing partial reflection and partial transmission of an optical signal between said gain blocks;

a first controllable gain associated with said first gain block and second controllable gain associated with said second gain block, wherein said first and second controllable gains have values which force said optical signal processor to operate in an unstable region and thereby produce an oscillation so that an output signal comprises a tunable line frequency; and an output coupling transmitting an output signal comprising partial transmission signals from said first gain block and said second gain block, wherein said optical signal processor is a wavelength division multiplexer using said tunable line frequency as an optical carrier which is modulated onto an information sequence.

\* \* \* \* \*